(12) United States Patent
Salah

(10) Patent No.: US 8,609,189 B2
(45) Date of Patent: Dec. 17, 2013

(54) METHOD OF FORMING CARBON NANOTUBES FROM CARBON-RICH FLY ASH

(75) Inventor: Numan Abdullah Salah, Jeddah (SA)

(73) Assignee: King Abdulaziz University, Jeddah (SA)

( * ) Notice: Subject to any disclaimer, the term of this patent is extended or adjusted under 35 U.S.C. 154(b) by 169 days.

(21) Appl. No.: 13/247,588

(22) Filed: Sep. 28, 2011

(65) Prior Publication Data

US 2013/0078374 A1 Mar. 28, 2013

(51) Int. Cl.
| | |
|---|---|
| B05D 7/00 | (2006.01) |
| C04B 14/00 | (2006.01) |
| C23C 16/26 | (2006.01) |
| C23C 16/00 | (2006.01) |

(52) U.S. Cl.
USPC ........... 427/215; 106/405; 977/840; 977/842; 977/843; 977/890; 427/249.1

(58) Field of Classification Search
USPC ............... 427/249.1, 294, 215; 977/843, 844, 977/840, 841, 890, 842; 106/405
See application file for complete search history.

(56) References Cited

U.S. PATENT DOCUMENTS

| | | | |
|---|---|---|---|
| 4,033,286 A | | 7/1977 | Chern et al. |
| 5,988,396 A | | 11/1999 | Minkara et al. |
| 6,269,952 B1 | * | 8/2001 | Watt et al. ......................... 209/3 |
| 6,346,303 B1 | | 2/2002 | Shih et al. |
| 6,350,488 B1 | | 2/2002 | Lee et al. |
| 6,764,874 B1 | | 7/2004 | Zhang et al. |
| 7,431,965 B2 | | 10/2008 | Grigorian et al. |
| 7,682,590 B2 | | 3/2010 | Sakakibara et al. |
| 2004/0105807 A1 | | 6/2004 | Fan et al. |
| 2009/0229494 A1 | | 9/2009 | Shah et al. |
| 2010/0092369 A1 | | 4/2010 | Parsapour |
| 2010/0227058 A1 | * | 9/2010 | Zhang et al. ............... 427/249.1 |

FOREIGN PATENT DOCUMENTS

| | | |
|---|---|---|
| EP | 1964812 A1 | 9/2008 |
| WO | WO 98/25704 | 6/1998 |

OTHER PUBLICATIONS

Yasui et al., "Synthesis of Carbon Nanotubes on Fly Ashes by Chemical Vapor Deposition Processing", Institute of Electrical Engineers of Japan, Published by John Wiley & Sons, Inc., 2009, pp. 787.*

(Continued)

Primary Examiner — Timothy Meeks
Assistant Examiner — Ann Disarro
(74) Attorney, Agent, or Firm — Richard C. Litman

(57) ABSTRACT

The method of forming carbon nanotubes from carbon-rich fly ash is a chemical vapor deposition-based method for forming carbon nanotubes from recycled carbon-rich fly ash. The method includes first ultrasonically treating the carbon-rich fly ash to produce an ultrafine powdered ash, and then reacting the ultrafine powdered ash in a low pressure chemical vapor deposition reactor to form the carbon nanotubes. The ultrasonic treatment of the carbon-rich fly ash includes the steps of dissolving the carbon-rich fly ash in water to form a solution, then sonicating the solution, separating the ultrafine powdered ash from the solution, and finally drying the ultrafine powdered ash. The method provides for total conversion of the carbon-rich fly ash to carbon nanotubes having a variety of differing diameters and lengths, including multi-walled carbon nanotubes with a high degree of wall graphitization and C=C double bonds stretching at 1635 $cm^{-1}$.

9 Claims, 9 Drawing Sheets

(56) References Cited

OTHER PUBLICATIONS

Zeeshan et al., "Structural and Magnetic Characterization of Batch-Fabricated Nickel Encapsulated Multi-Walled Carbon Nanotubes", IOP Publishing, Nanotechnology 22. Mar. 15, 2011, p. 4.*

Shankar et al., "Synthesis of Tungsten Oxide (WO3) Nanorods using Carbon Nanotubes as Templates by Hot Filament Chemical Vapor Deposition", Elsevier B.V., Science Direct, 2005, p. 772.*

* cited by examiner

METHOD OF FORMING CARBON NANOTUBES FROM CARBON-RICH FLY ASH

BACKGROUND OF THE INVENTION

1. Field of the Invention

The present invention relates to methods of forming carbon nanotubes, and particularly to a method of forming carbon nanotubes from carbon-rich fly ash by chemical vapor deposition.

2. Description of the Related Art

Fly ash is one of the residues generated in combustion, and is formed from the fine particles that rise with the flue gases. Fly ash is generally captured by electrostatic precipitators or other particle filtration equipment before the flue gases reach the chimneys of coal-fired power plants. Depending upon the source and makeup of the coal being burned, the components of fly ash vary considerably, but all fly ash includes substantial amounts of silicon dioxide ($SiO_2$) (both amorphous and crystalline) and calcium oxide (CaO), both being endemic ingredients in many coal-bearing rock strata.

Fly ash is typically seen as an environmental hazard and is considered a waste product with little to no reclamation potential. Water desalination processes, in particular, create large quantities of fly ash, typically in the form of carbon-rich flue ash. Power plants also produce large quantities of such carbon-rich fly ash, typically from crude and heavy oil processes. For example, in Saudi Arabia, water desalination plants and power plants, which are typically fueled by crude oil or heavy oil, produce large amounts of fly ash daily that may have a carbon content of 80%-90%, the remainder being oxides of silicon, aluminum, nickel, vanadium and iron. Most of this fly ash is treated as waste, and is disposed of at landfills.

Due to the environmental hazards of producing fly ash and disposal of fly ash as a common byproduct of many industrial processes, it would be desirable to provide a method for recycling the fly ash into useful components, such as reactive carbon, which could be used for other desired processes.

Thus, a method of forming carbon nanotubes from carbon-rich fly ash solving the aforementioned problems is desired.

SUMMARY OF THE INVENTION

The method of forming carbon nanotubes from carbon-rich fly ash is a chemical vapor deposition-based method for forming carbon nanotubes from recycled carbon-rich fly ash. The method includes first ultrasonically treating the carbon-rich fly ash to produce an ultrafine powdered ash, and then reacting the ultrafine powdered ash in a low pressure chemical vapor deposition reactor to form the carbon nanotubes. The ultrasonic treatment of the carbon-rich fly ash includes the steps of dissolving the carbon-rich fly ash in water to form a solution, then sonicating the solution, separating the ultrafine powdered ash from the solution, and finally drying the ultrafine powdered ash. The method provides for total conversion of the carbon-rich fly ash to carbon nanotubes having a variety of differing diameters and lengths, including multi-walled carbon nanotubes with a high degree of wall graphitization and C=C double bonds stretching at 1635 $cm^{-1}$. Thus, the method is suitable for large-scale production of carbon nanotubes and also provides a reclamation and recycling method for fly ash waste.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
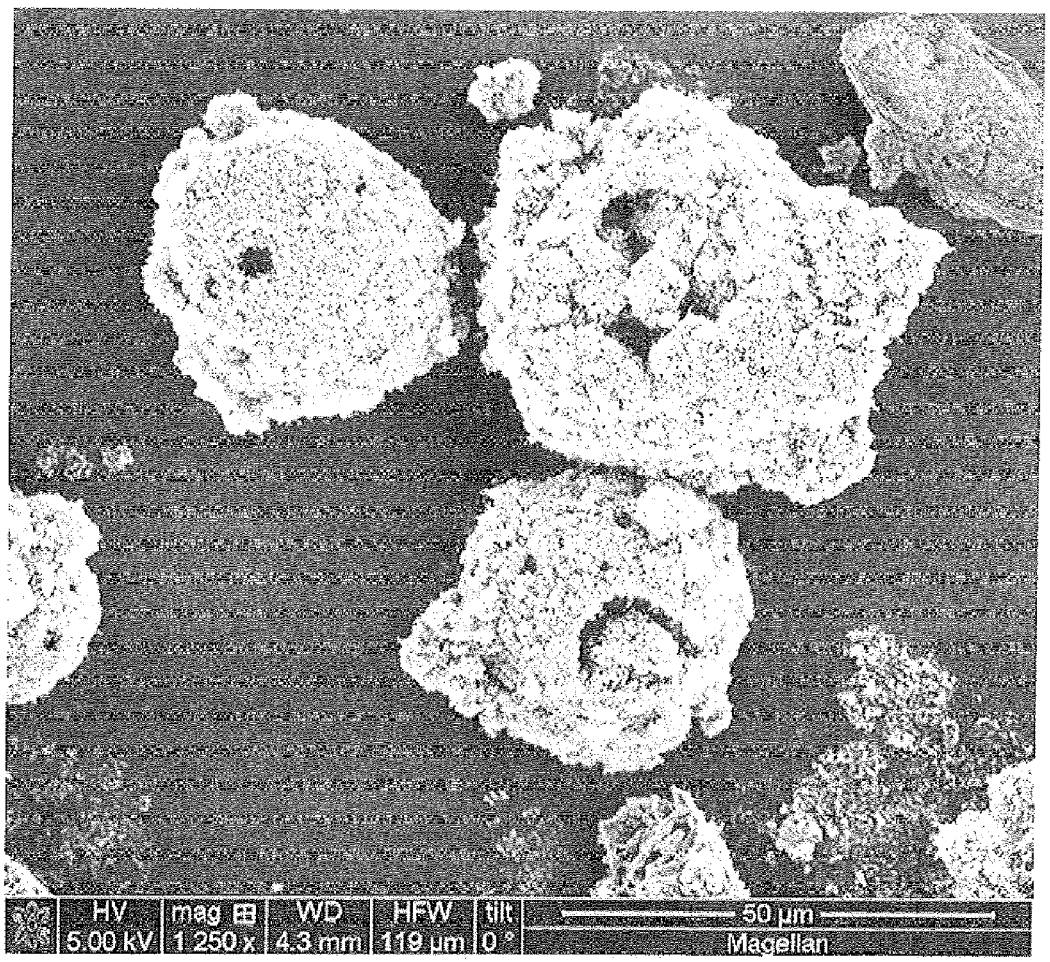
FIGS. 1A, 1B and 1C illustrate scanning electron microscope (SEM) images of carbon nanotubes at magnifications of 1,250×, 5,000× and 100,000×, respectively, the nanotubes being formed by the method of forming carbon nanotubes from carbon-rich fly ash according to the present invention.

The method of forming carbon nanotubes from carbon-rich fly ash is a chemical vapor deposition-based method for forming carbon nanotubes from recycled carbon-rich fly ash. The method includes first ultrasonically treating the carbon-rich fly ash to produce an ultrafine powdered ash, and then reacting the ultrafine powdered ash in a low pressure chemical vapor deposition reactor to form the carbon nanotubes. The ultrasonic treatment of the carbon-rich fly ash includes the steps of dissolving or immersing the carbon-rich fly ash in water to form a solution, then sonicating the solution, separating the ultrafine powdered ash from the solution, and finally drying the ultrafine powdered ash.

For purposes of demonstrating the method of forming carbon nanotubes from carbon-rich fly ash, carbon-rich fly ash powder, ultrasonically pretreated as described above, was used as a carbon co-precursor along with acetylene gas in a low pressure chemical vapor deposition reactor manufactured by Syskey Technology Ltd. of Taiwan. The fly ash also acts as a catalyst, with nitrogen gas ($N_2$) being used as the carrier gas. The Syskey Technology Ltd. low pressure chemical vapor deposition reactor has a maximum temperature of 1500° C., a control accuracy of ±1° C., and a temperature uniformity of less than ±5%. The reactor chamber is formed from quartz with an inner diameter on the order of 2 inches to ~8 inches, and is capable of reducing pressure to ≤$10^{-3}$ Torr. In experimental practice, approximately 5 g of the carbon-rich fly ash was dissolved in approximately 200 ml of the water. The fly ash was obtained from water desalination plants in Saudi Arabia. Chemical analysis on the fly ash indicated that the fly ash was 84.3% pure carbon, with the remainder of the fly ash largely being oxides of silicon, aluminum, nickel, vanadium and iron.

The dissolved fly ash formed a sonicator bath, and the ultrasonic treatment was performed on the bath for approximately five hours. The output power of the sonicator was 100 W and the frequency was 42 kHz. It should be understood that any suitable type of sonicator may be utilized. Following sonication, the fine suspended particles were separated and dried at a temperature of approximately 70° C.

Approximately 2 g of ultrafine dried powdered fly ash was obtained from the sonication, separation and drying, and the 2 g of ultrafine dried powdered fly ash was placed on a quartz boat and placed in the quartz reactor tube of the low pressure carbon vapor deposition reactor. The reactor tube was depressurized to a pressure of approximately $10^{-3}$ Torr, and then heated to a maximum temperature of 700° C. at a rate of approximately 20° C./min. It should be understood that the carbon nanotubes' growth using fly ash may occur at temperatures in the range of approximately 600-900° C.

When the temperature within the reactor tube reached the maximum temperature of 700° C., a mixture of $N_2$ and $C_2H_2$ gases were introduced with flow rates of 200 standard cubic centimeters per minute (sccm) and 50 sccm, respectively. Growth time in the reactor was kept fixed at approximately 20 minutes, and the chamber pressure was maintained at approximately 15 Torr. It should be understood that other carrier gases may be used, such as, for example, argon or other hydrocarbon gases used as co-precursors, such as ethane ($C_2H_6$) or methane ($CH_4$).

Chemical vapor deposition (CVD) is a common chemical process used to produce high-purity, high-performance solid materials. Low pressure chemical vapor deposition (LPCVD) is chemical vapor deposition that occurs at sub-atmospheric pressures. The reduced pressure in LPCVD reduces unwanted gas-phase reactions and improves film uniformity. CVD and LPCVD are well known processes in the production of thin films. Examples of such processes and reactors are shown in U.S. Pat. Nos. 4,033,286; 6,346,303; 6,350,488; 6,764,874; and 7,431,965, each of which is herein incorporated by reference. It should be understood that any suitable type of CVD or LPCVD process may be used in the present method.

Figure 1B:
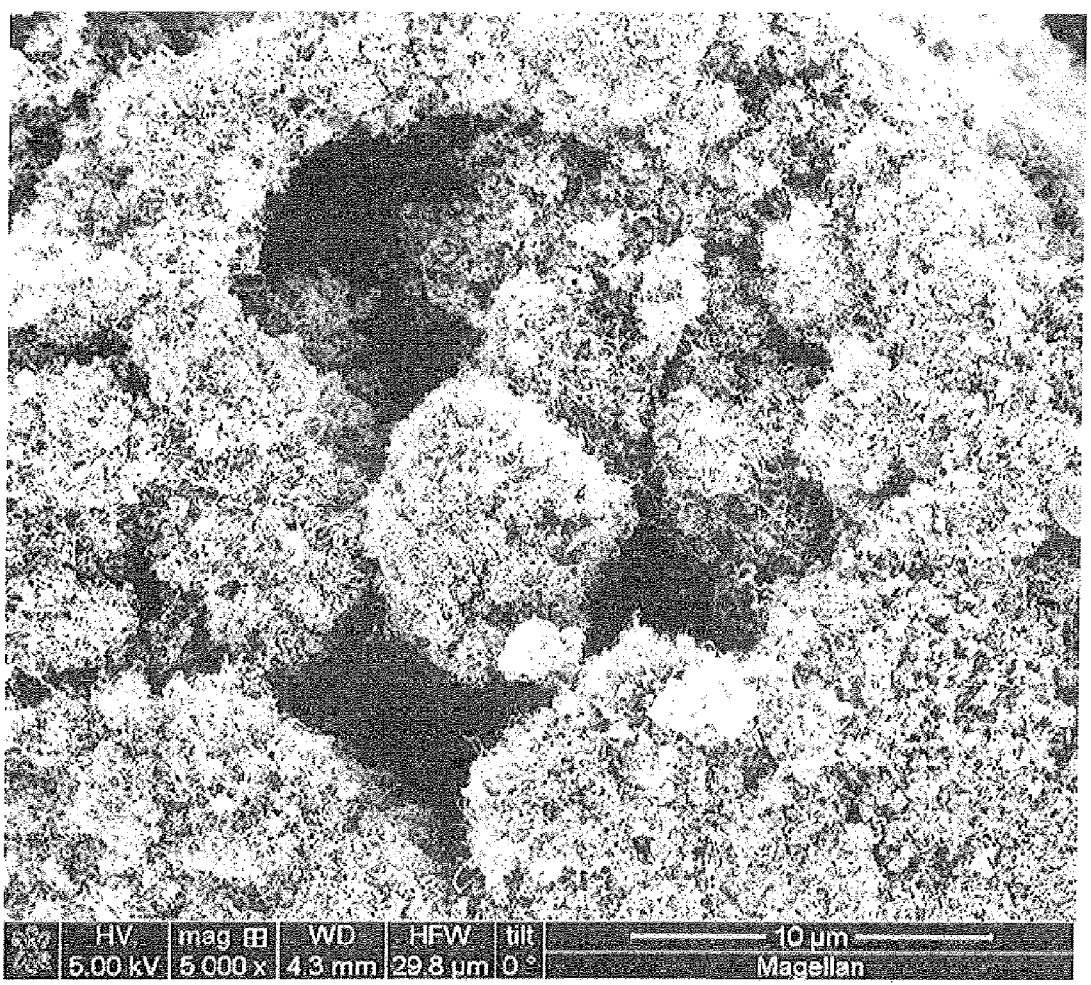
Figure 1C:
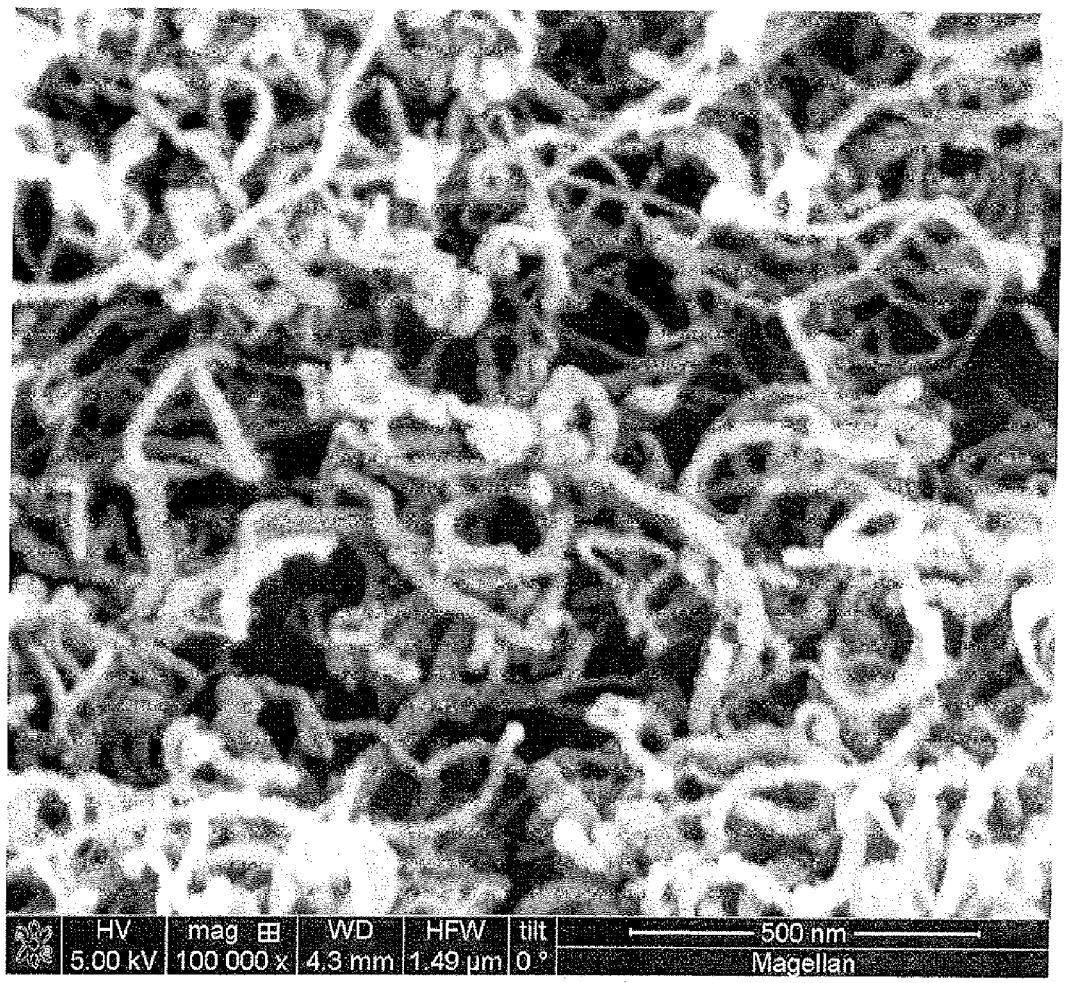

The color of the output sample of carbon nanotubes was converted to dark black, with a significant increase in volume. FIGS. 1A, 1B and 1C illustrate scanning electron microscope (SEM) images of the grown carbon nanotubes at magnifications of 1,250×, 5,000× and 100,000×, respectively. FIGS. 1A, 1B and C show total conversion of the carbon-rich fly ash to carbon nanotubes having a variety of differing diameters and lengths.

Figure 2A:
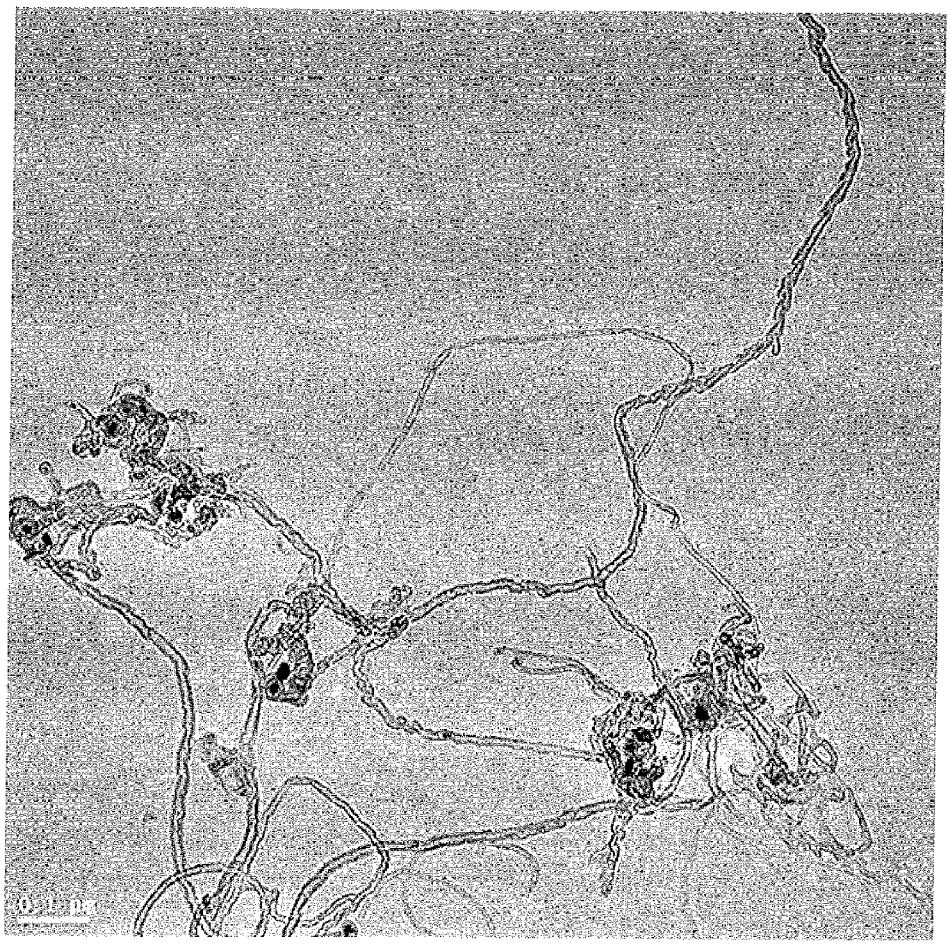
FIG. 2A is a transmission electron microscope (TEM) image of carbon nanotubes formed by the method of forming carbon nanotubes from carbon-rich fly ash according to the present invention.
Figure 2B:
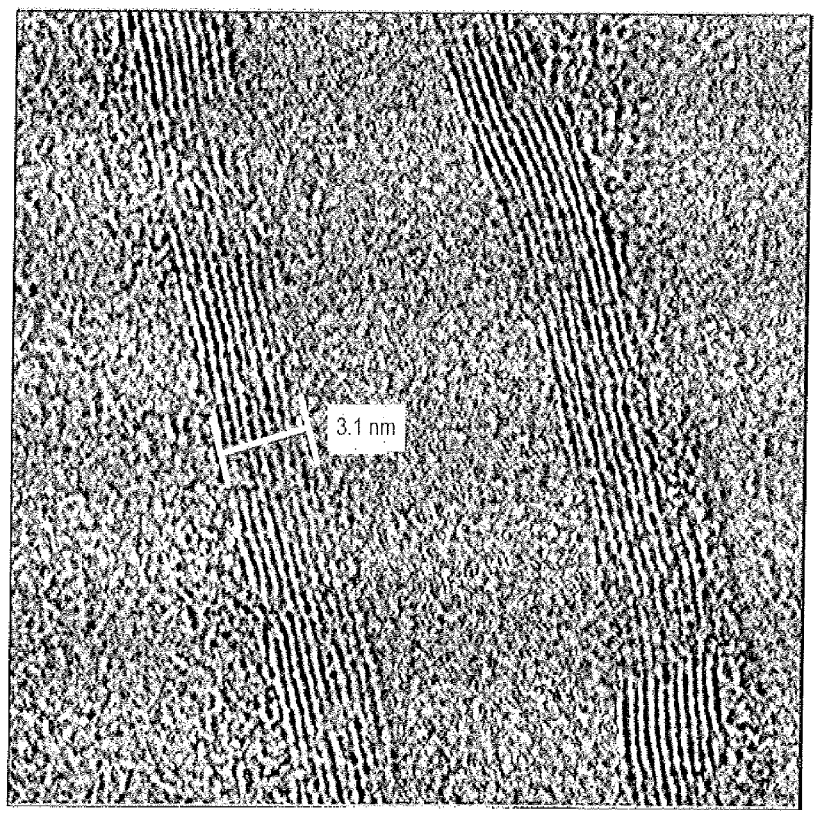
FIG. 2B is a high-resolution transmission electron microscope (HRTEM) image of the carbon nanotubes formed by the method of forming carbon nanotubes from carbon-rich fly ash according to the present invention, particularly showing the formation of multi-walled carbon nanotubes.

FIG. 2A illustrates a transmission electron microscope (TEM) image of the grown carbon nanotubes, and FIG. 2B illustrates a high-resolution transmission electron microscope (HRTEM) image of the grown carbon nanotubes, particularly showing the growth of multi-walled carbon nanotubes.

Figure 3A:
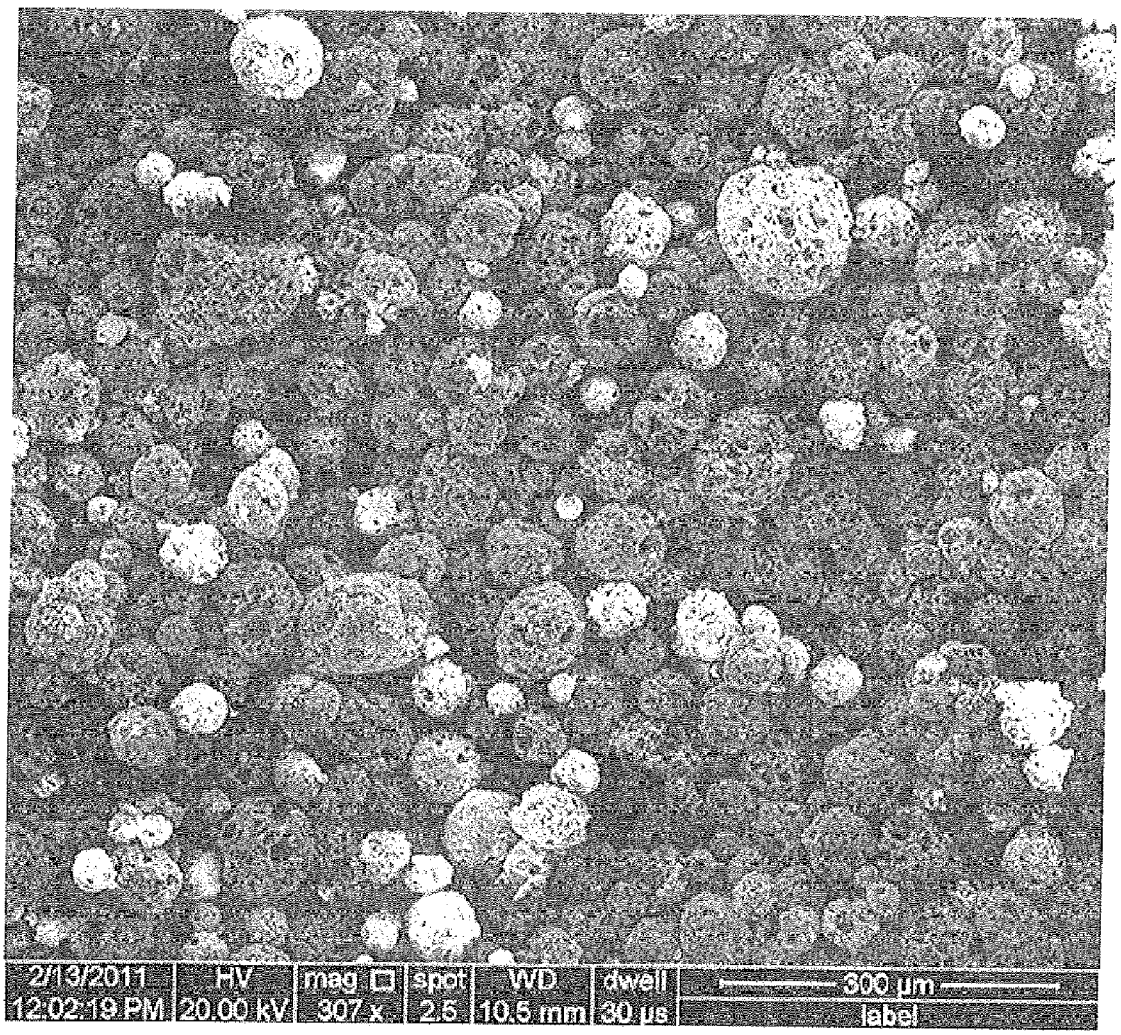
FIGS. 3A and 3B are SEM images of carbon-rich fly ash used to demonstrate the method of forming carbon nanotubes from carbon-rich fly ash according to the present invention at magnifications of 307× and 3,788×, respectively.
Figure 3B:
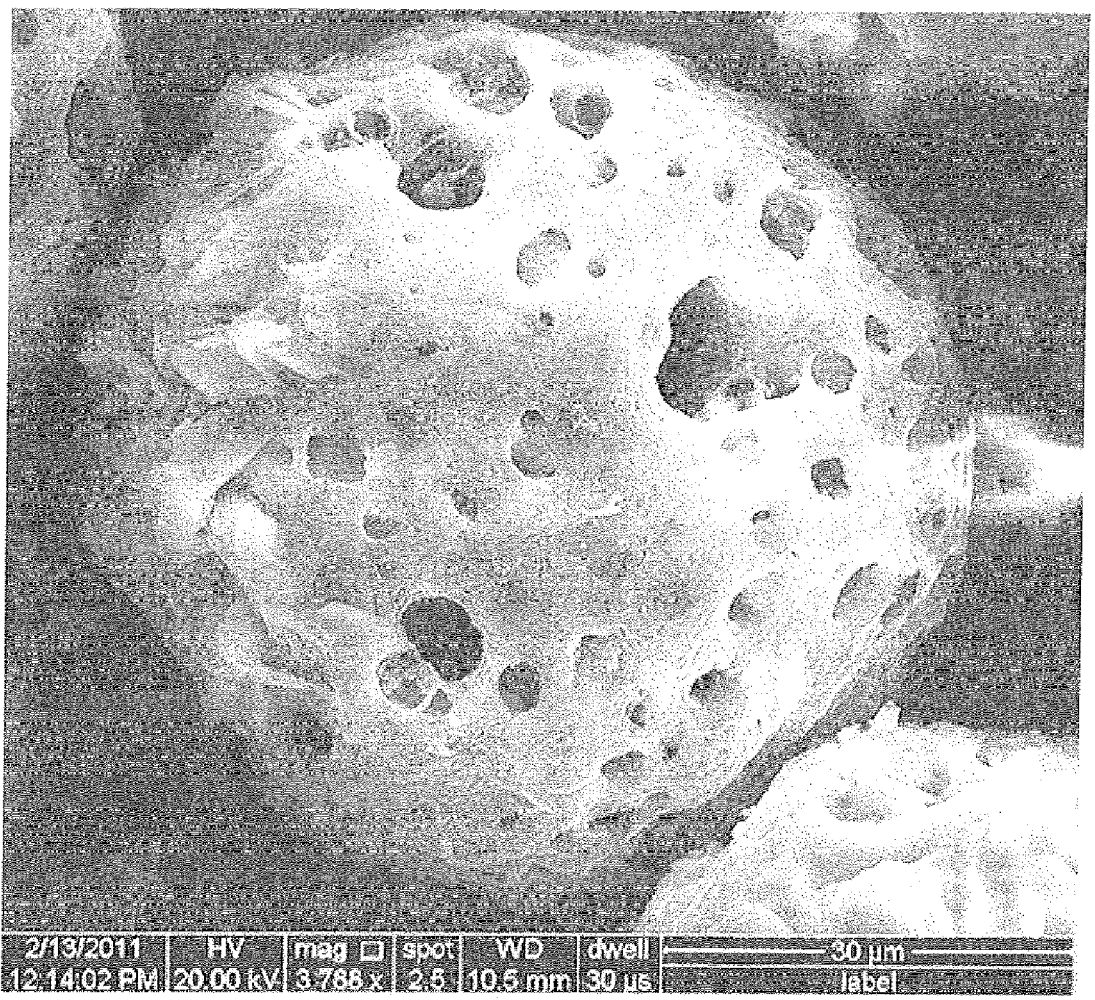
Figure 4:
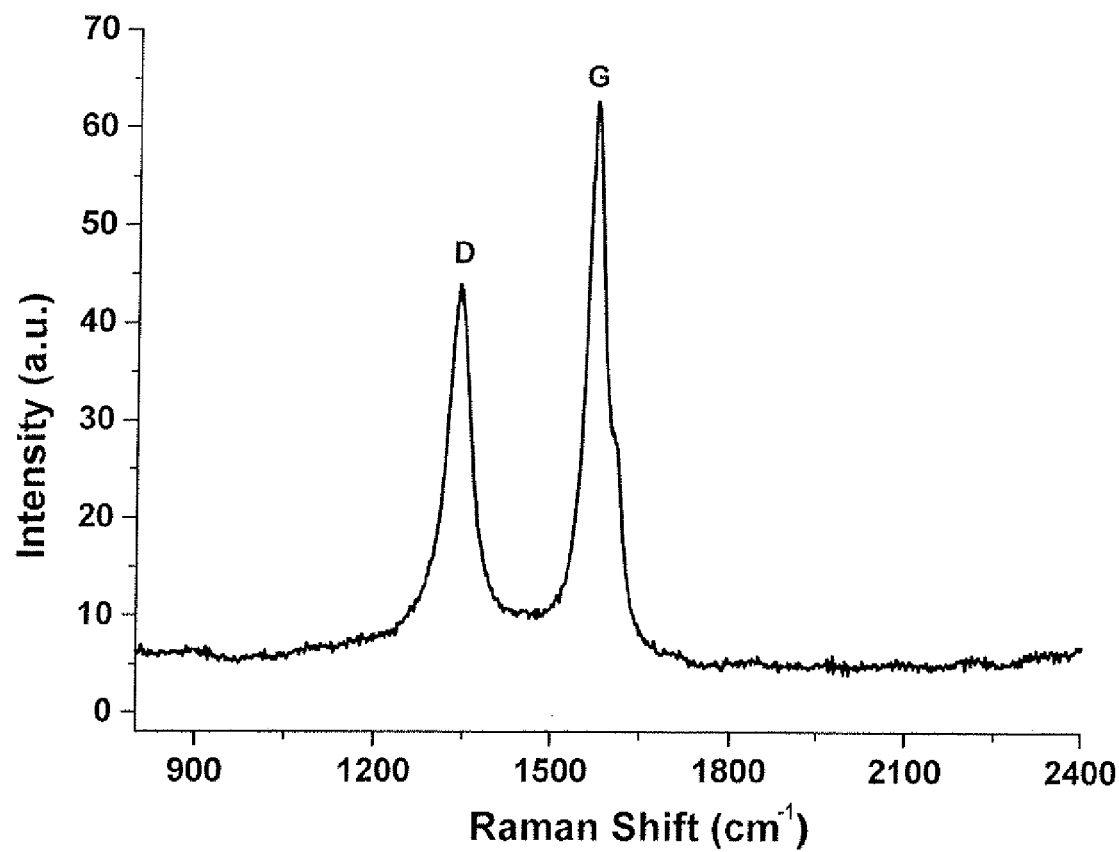
FIG. 4 illustrates the Raman spectra for the exemplary carbon nanotubes produced by the method of forming carbon nanotubes from carbon-rich fly ash according to the present invention, particularly indicating a high degree of wall graphitization ($I_G/I_D$~1.5).
Figure 5:
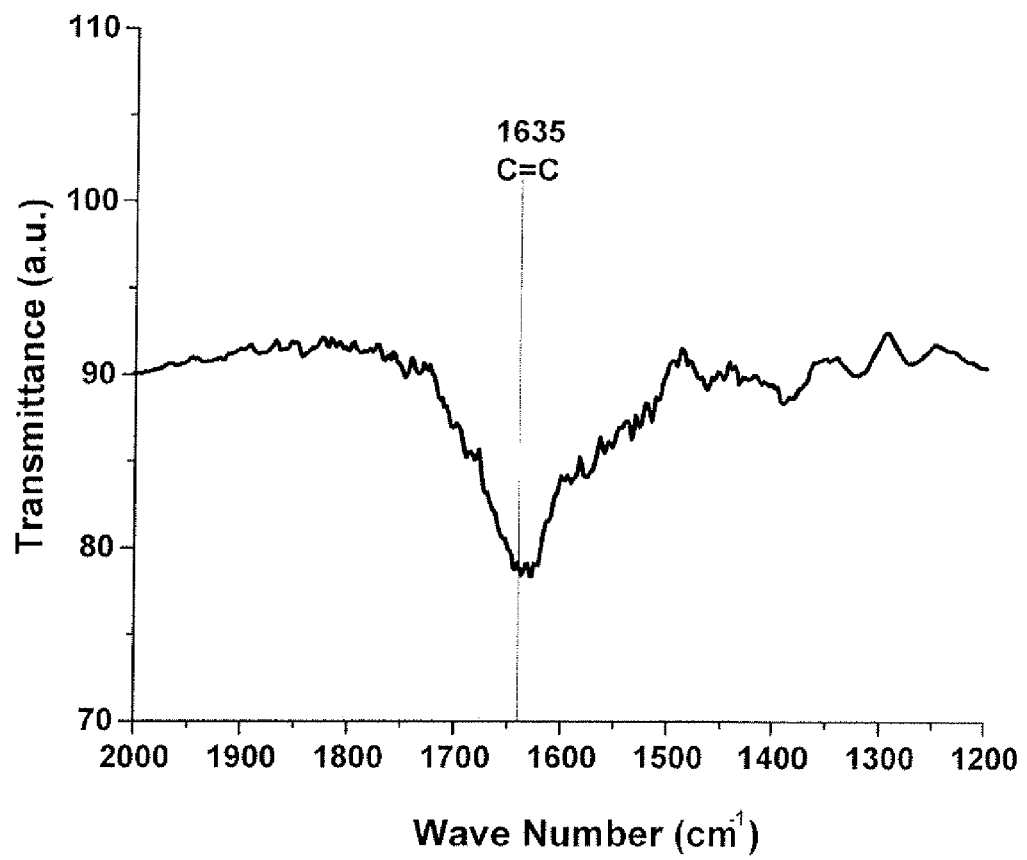
FIG. 5 illustrates a Fourier transform infrared spectroscopy (FTIR) curve for the exemplary carbon nanotubes produced by the method of forming carbon nanotubes from carbon-rich fly ash according to the present invention, particularly showing a C=C double bond stretching at 1635 $cm^{-1}$.

FIGS. 3A and 3B are SEM images of the carbon-rich fly ash at magnifications of 307× and 3,788×, respectively. FIG. 4 illustrates the Raman spectra for the produced carbon nanotubes, indicating a high degree of wall graphitization ($I_G/I_D$~1.5), and the Fourier transform infrared spectroscopy (FTIR) curve of FIG. 5 shows a C=C double bond stretching at 1635 cm$^{-1}$. Thus, the method is suitable for large-scale production of carbon nanotubes and also provides a reclamation and recycling method for fly ash waste.

In the above, the treatment of the fly ash by ultrasound waves was used to break down large solidified fly ash particles and to enrich sp$^2$ hybridized carbons. It is known that ultrasound waves can transform graphite into diamonds by means of sp$^2$-hybridized carbons being transformed into sp$^3$. Additionally, some sp$^3$ carbons may be converted into sp$^2$ carbons, which are required for carbon nanotube (CNT) growth. Further, it is also known that incomplete combustion of carbon-rich materials leaves products that still contain hydrocarbon compounds. These hydrocarbons could also decompose easily inside a tube furnace and provide sp$^2$-hybridized carbons. As noted above, acetylene gas was used as a co-precursor for CNT growth, along with $N_2$ as a carrier gas.

It is to be understood that the present invention is not limited to the embodiments described above, but encompasses any and all embodiments within the scope of the following claims.

I claim:

1. A method of forming carbon nanotubes from ultrasonically treated carbon-rich fly ash of burned heavy oil from desalination plants and power plants, comprising the steps of:
   providing carbon-rich fly ash of burned heavy oil from desalination plants and power plants;
   ultrasonically treating the carbon-rich fly ash to produce an ultrafine powdered ash, wherein the hybridization for each carbon is sp2, the ultrasonic treatment includes the steps of:
     dissolving the carbon-rich fly ash in water to form a solution;
     sonicating the solution for about five hours;
     separating the ultrafine powdered ash from the solution; and
     drying the ultrafine powdered ash; and
   reacting the ultrafine powdered ash in a low pressure chemical vapor deposition reactor to form carbon nanotubes, the reacting step further comprises the step of introducing a carrier gas into the reactor when the temperature of the reactor reaches about 700° C., wherein the carrier gas is at least nitrogen.

2. The method of forming carbon nanotubes from carbon-rich fly ash as recited in claim 1, wherein said step of sonicating the solution comprises applying a sonicator to the solution with a power output of about 100 W at a frequency of about 42 kHz.

3. The method of forming carbon nanotubes from carbon-rich fly ash as recited in claim 1, wherein said step of drying the ultrafine powdered ash comprises drying the ultrafine powdered ash at a temperature of about 70° C.

4. The method of forming carbon nanotubes from carbon-rich fly ash as recited in claim 1, wherein said step of reacting the ultrafine powdered ash in the low pressure chemical vapor deposition reactor to form the carbon nanotubes comprises the steps of:
   placing the ultrafine powdered ash in a quartz reactor tube of the low pressure chemical vapor deposition reactor;
   evacuating gas from the quartz reactor tube to achieve a pressure of about 10-3 Torr; and
   heating the quartz reactor tube.

5. The method of forming carbon nanotubes from carbon-rich fly ash as recited in claim 4, wherein said step of heating the quartz reactor tube comprises heating the quartz reactor tube at a rate of about 20° C./min to reach a maximum temperature of about 700° C.

6. The method of forming carbon nanotubes from carbon-rich fly ash as recited in claim 1, wherein said step of introducing the carrier gas into the reactor comprises introducing a mixture of N2 and C2H2 gases into the reactor at flow rates of about 200 sccm and 50 sccm, respectively.

7. The method of forming carbon nanotubes from carbon-rich fly ash as recited in claim 1, wherein the formation of the carbon nanotubes within the low pressure chemical vapor deposition reactor occurs over a pre-selected time period.

8. The method of forming carbon nanotubes from carbon-rich fly ash as recited in claim 7, wherein the pre-selected time period is about twenty minutes.

9. The method of forming carbon nanotubes from carbon-rich fly ash as recited in claim 1, wherein the low pressure chemical vapor deposition reactor is maintained at a pressure of approximately 15 Torr during the formation of the carbon nanotubes.

* * * * *